United States Patent [19]
McLellen

[11] Patent Number: 6,152,514
[45] Date of Patent: Nov. 28, 2000

[54] RESILIENT CONSOLE FOR A PASSENGER VEHICLE

[76] Inventor: Arthur O. McLellen, 59 Kathryn Dr., Marietta, Ga. 30066

[21] Appl. No.: 09/208,698

[22] Filed: Dec. 10, 1998

[51] Int. Cl.$^7$ .................................................... B60N 3/12
[52] U.S. Cl. ................ 296/37.8; 296/24.1; 297/188.19; 297/411.24
[58] Field of Search ................ 296/37.1, 37.8, 296/37.14, 24.1; 297/411.24, 188.14, 188.19

[56] References Cited

U.S. PATENT DOCUMENTS

| | | | |
|---|---|---|---|
| 2,678,682 | 5/1954 | Thomas | 297/411.24 |
| 3,083,998 | 4/1963 | Morris | 297/411.24 |
| 3,118,704 | 1/1964 | Meserve | 297/411.24 |
| 3,356,409 | 12/1967 | Belsky et al. | 296/24.1 |
| 3,909,092 | 9/1975 | Kiernan | 312/235 |
| 3,951,448 | 4/1976 | Hawie | 297/188.19 |
| 4,027,916 | 6/1977 | McElroy | 297/188.19 |
| 4,453,759 | 6/1984 | Kathiria | 296/37.8 |
| 4,512,503 | 4/1985 | Gioso | 296/37.8 |
| 4,796,791 | 1/1989 | Goss et al. | 224/275 |
| 5,076,641 | 12/1991 | Lindberg | 297/188.19 |
| 5,085,481 | 2/1992 | Fluharty et al. | 296/37.8 |
| 5,096,152 | 3/1992 | Christiansen et al. | 297/188.19 |
| 5,106,143 | 4/1992 | Soeters | 296/37.8 |
| 5,205,452 | 4/1993 | Mankey | 224/275 |
| 5,316,368 | 5/1994 | Arbisi | 297/188.19 |
| 5,338,081 | 8/1994 | Young et al. | 296/37.8 |
| 5,397,160 | 3/1995 | Landry | 296/37.8 |
| 5,492,068 | 2/1996 | McKee | 296/37.8 |
| 5,511,755 | 4/1996 | Spykerman | 297/188.14 |
| 5,562,331 | 10/1996 | Spykerman et al. | 297/188.19 |
| 5,639,002 | 6/1997 | Weitbrecht et al. | 297/188.19 |
| 5,715,966 | 2/1998 | Nagano et al. | 296/37.8 |
| 5,752,740 | 5/1998 | Volkmann et al. | 297/188.19 |
| 5,823,599 | 10/1998 | Gray | 296/37.8 |
| 5,854,965 | 12/1998 | Heath et al. | 297/188.14 |
| 5,863,089 | 1/1999 | Ignarra et al. | 296/37.8 |

FOREIGN PATENT DOCUMENTS

| | | | |
|---|---|---|---|
| 0224839 | 10/1991 | Japan | 296/37.8 |
| 405139199 | 6/1993 | Japan | 296/37.8 |
| 406107073 | 4/1994 | Japan | 296/37.14 |

*Primary Examiner*—Joseph D. Pape
*Assistant Examiner*—Kiran Patel
*Attorney, Agent, or Firm*—Thomas, Kayden, Horstemeyer & Risley

[57] ABSTRACT

A resilient console (10) for a passenger vehicle for holding small to medium sized items stationary and within the reach of the occupants of the vehicle. The resilient console (10) includes a substantially rigid frame (12) and a substantially resilient body (14) with an outer skin (16). A storage compartment (38) is enclosed by a removable closure or lid (52). The top layer (54) of the lid is substantially resilient. A storage recess (58) is formed in the console (10).

2 Claims, 3 Drawing Sheets

RESILIENT CONSOLE FOR A PASSENGER VEHICLE

TECHNICAL FIELD

The present invention relates generally to consoles for passenger vehicles. More specifically, the present invention relates to consoles for utilization in a passenger vehicle to contain and mount small to medium sized articles within convenient reach of the driver and/or other passengers in the vehicle.

BACKGROUND OF THE INVENTION

There has been a long recognized need to contain and mount small to medium sized items (including lights, utility dials, televisions and beverages) in a passenger vehicle and within the reach of the occupants of the vehicle. Many passenger vehicles are manufactured and sold with one or more consoles installed in them, usually between the driver's and front passenger's seats. However, some vehicles are lacking such conveniences in their design and still others, such as vans and trucks, may have only one such console for the front or back seat occupants, or only on the floor, even though such a device would be desirable in other areas of seating in the vehicle or on the interior ceiling. Indeed, there has been a long proven market for consoles that can be added to a vehicle after the vehicle has been designed and manufactured. Numerous such consoles and food trays of varying shapes and sizes have been designed in embodiments that adapt to being mounted or placed on the floor, ceiling, seats, dashboards, and even doors of vehicles.

Heretofore, such passenger vehicle consoles have suffered from several deficiencies. Specifically, such consoles are usually formed of hard plastic, wood, metal or a combination thereof, and the various pieces are attached together by conventional fasteners or hinges. Such consoles are somewhat easily cracked or broken, generally lack insulation, are expensive, and more importantly can be a safety hazard for the vehicle occupants. The forces present in a vehicle under normal operation or the extreme forces present due to an accident can cause an occupant to be thrown into such consoles or, if not securely fixed to the vehicle, the console can be thrown into the occupants. Whether or not the console is attached to the vehicle, a passenger risks coming into contact with the console as a result of such forces. Additionally, particularly with ceiling mounted consoles in conversion vans or the like, the occupants of the vehicle are likely to strike their heads on the console as the occupants move around inside the vehicle or are getting in or out of the vehicle. Also, the larger consoles and the more conveniently placed consoles seem to be more of an obstruction to movement of the passengers of the vehicle, and therefore more likely to interfere with leg, foot and head movements of the passengers.

With the forgoing disadvantages of the prior art in mind, it is an object of the present invention to provide a passenger vehicle console for containing and mounting small to medium sized items that can be placed within reach of the operator and/or passengers of a vehicle that provides a soft exterior that is resilient upon contact with occupants of the vehicle.

It is another object of the present invention to provide such a console that is relatively inexpensive and easy to install with conventional console installation means.

It is yet another object of the present invention to provide such a console that is easy to clean, insulated, shatter proof, non-breakable, and which is compatible with the position and movements of adjacent structural components of a vehicle.

Other objects, features and advantages of the present invention will become apparent upon reading the following specification, when taken in conjunction with the accompanying drawings.

SUMMARY OF THE INVENTION

The present invention provides an apparatus for containing and mounting small to medium sized items in a passenger vehicle within the reach of the occupants of the vehicle and a method for assembling such an apparatus. Briefly described, in architecture, the apparatus can be implemented as follows.

In one embodiment, the present invention relates to a floor mounted console for containing and the mounting thereto of small to medium sized items, including lights, utility dials, switches, televisions and beverages in a passenger vehicle within the convenient reach of the occupants of the vehicle. The console essentially comprises a rigid internal frame or housing and a resilient exterior body adhered to and enclosing the rigid internal frame. The rigid internal frame forms a continuous surface to which the resilient body is adhered to, with the resilient body formed of a molded expanded foam. The material from which the internal frame is formed is wood or other material to which the expanded foam will adhere. The resilient exterior body is disposed on and around at least the vertical surfaces of the rigid frame. An internal storage compartment or cavity can be formed in the frame of the floor mounted console. For example, the storage compartment can have an open end portion, usually facing upwardly when the console is mounted on the floor of the vehicle, to provide access to the storage compartment. The storage compartment can be used for storage of random articles or shaped to receive specific articles, such as a small television set, compact disk player, etc.

In another aspect of the invention, the console, usually in a lower profile embodiment, is adapted for ceiling mount in a van, or the like. The ceiling mounted embodiment usually is used to contain and mount small to medium sized items, including but not limited to lights, utility dials, and switches. The ceiling mounted console is compatible with standard clips used in fixing items to the interior roof of passenger vehicles, whereby the clips are fixed to the ribs in the roof of the vehicle and the clips are accepted by the console through an axially aligned pair of openings in the rigid frame and body of the console.

The present invention can also be viewed as a novel method of construction of a console. First, a mold is made which is to form the resilient material about the rigid frame. A rigid frame is built of smaller exterior breadth than the interior breadth of the mold and is placed in the mold. Upon placing the frame in the mold, the bottom of the frame is placed on the bottom interior surface of the mold and the vertical sides and top of the frame are spaced predetermined distances from the facing walls of the mold, thereby creating a space between the frame and the mold that surrounds the frame. A self-skinning, self-expanding, resilient material is introduced into the mold. The material expands to fill the space between the outside portion of the frame and the mold which surrounds the frame and adheres itself to the facing surfaces of the frame. The material is left undisturbed for a predetermined amount of time. The material forms a resilient body about the sides and top of the frame that is shatterproof and non-breakable, with a skin that is waterproof, making the console easy to clean. The spatial relationship between the mold and frame can be increased in some areas about the frame to form resilient cushions in the resilient exterior body and storage recesses such as cup holders can be molded in the bodies of the resilient cushions. The result of the molding process is the formation of a resilient body of unibody construction molded around and attached to an outside portion of the frame. Once assembled, the console can be mounted in a passenger vehicle to a rigid part of the vehicle, such as to the floor or interior roof of the vehicle.

As described above, the resilient console for a passenger vehicle of the present invention provides a console for containing and mounting small to medium sized items, including lights, utility dials, televisions and beverages, in a passenger vehicle within the reach of the operator and other occupants of the vehicle, whereby the console is resilient upon contact with occupants of the vehicle or other objects, cost effective, easy to install, insulated, shatterproof, non-breakable, and easy to clean.

Other features and advantages of the present invention will become apparent to one with skill in the art upon examination of the following drawings and detailed description. It is intended that all such additional features and advantages be included herein with in the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Figure 1:
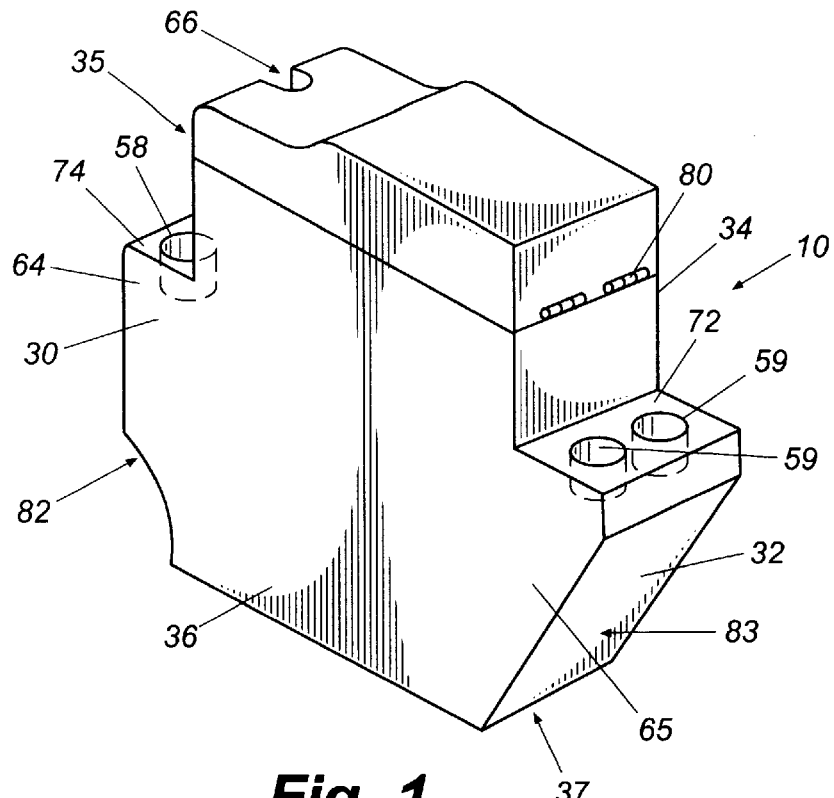
FIG. 1 illustrates an perspective view of the left side, rear and top portion of one embodiment of the console.
Figure 2:
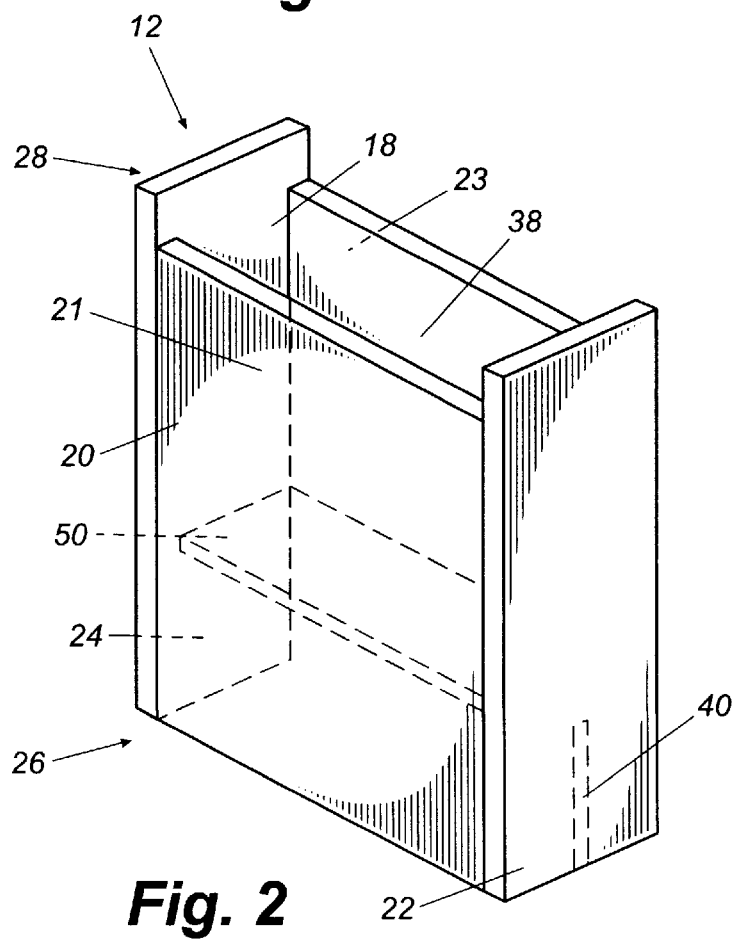
FIG. 2 illustrates a perspective view of the right side, front, and top portion of the frame.
Figure 3:
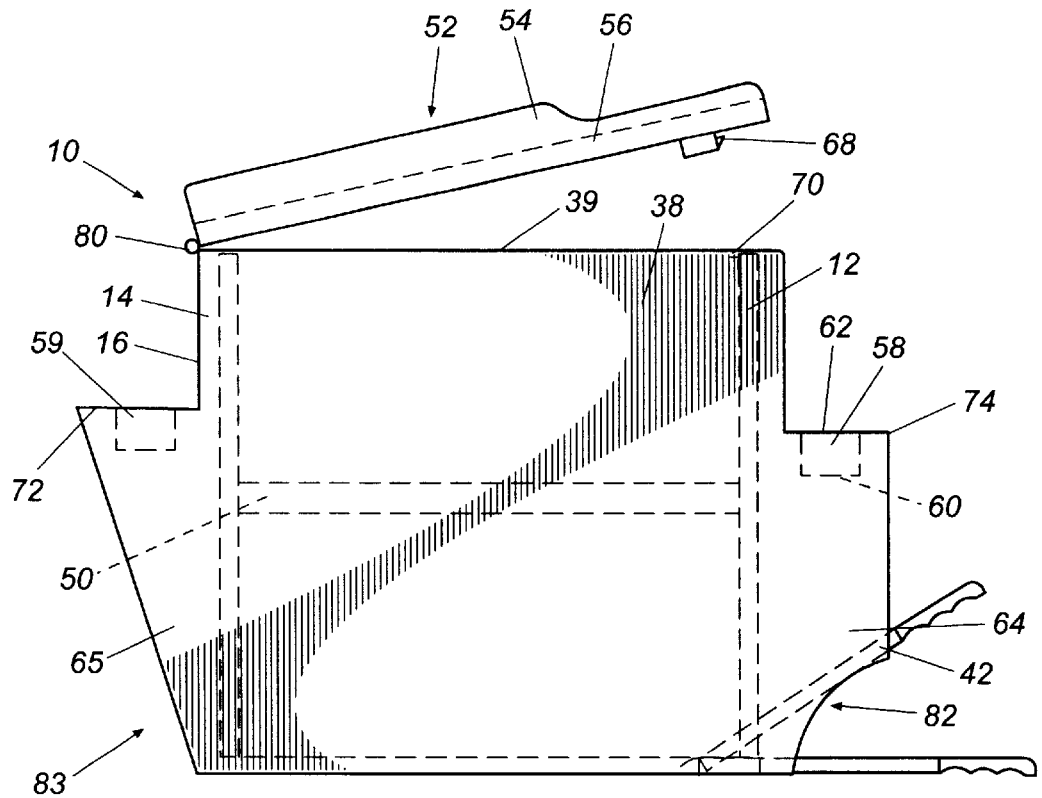
FIG. 3 illustrates a right side view of the console and frame.

FIGS. 1 through 3 illustrate a first preferred embodiment of the resilient console 10 for placement on the floor between adjacent front seats of a passenger vehicle. The console 10 includes a rigid interior frame 12 which functions as a rigid support housing and a soft, resilient exterior body 14 applied to the frame. As illustrated in FIG. 2, the frame 12 is preferably rectangular in shape and has a front wall 22, a rear wall 24, a right sidewall 21, and a left sidewall 23. Further included is an inner portion 18, an outside surface 20, an open top portion 28, and a bottom portion 26. As illustrated in FIGS. 1 and 3, the soft exterior body 14 includes a top portion 35 and a bottom portion 37, a front face 30, a rear face 32, a right side face 34, and a left side face 36. The walls 22, 24, 21 and 23 of the rigid frame 12 correspond to the faces 30, 32, 34 and 36 of the body 14, respectively. The rigid frame 12 is preferably constructed of a rigid material such as wood. The soft resilient body 14 is preferably constructed of a self-skinning, self-expanding, resilient polyurethane. The resilient body 14 has an outer skin 16 that is preferably waterproof that forms a continuous external surface about all of the laterally extending opposed side walls and opposed front and rear walls. Although described herein as being formed of particular materials, it will be understood that all elements can be made of other materials having similar such qualities.

In the first preferred embodiment, a storage compartment or chamber 38 is defined by the inner surfaces 18 of the frame 12 and a rigid inner shelf member 50 is disposed within the frame 12 and is supported intermediate the height of the frame by walls 21–24. The storage compartment 38 has an open top portion 28. The open top portion 28 of the storage recess 38 corresponds to the open top portion 28 of the frame 12. The open top portion 28 of the storage recess 38 is closed by a closure or lid 52. The closure 52 consists of a rigid bottom layer 56 and a resilient upper layer 54. The bottom layer 56 is constructed of a rigid material such as wood. The resilient upper layer 54 is constructed of a self-skinning, self-expanding, resilient polyurethane which usually is the same material as the soft exterior body 14 applied to frame 12. The closure 52 is attached at its rear edge by a hinge 80 to the upper edge of rear wall 24 and its front edge can be locked with a latch 68 and keeper 70 where the latch 68 is mounted on the bottom layer 56 of the lid 52 and the keeper 70 is mounted on the inner portion 18 of the frame 12, on the front wall 22.

Preferably, the soft resilient exterior body 14 is of unibody construction. In the embodiment shown in FIGS. 1 and 3, the resilient body includes enlarged thickness areas that project away from the rigid frame 12 and form a front cushion 64 on the front face 30 of the body 14 and a rear cushion 65 on the rear face 32 of the body 14. The front cushion 64 includes an upper planar horizontal surface 74 extending outward to an outer edge. The upper planar surface 74 extends from and is approximately perpendicular to the front face 30 of the body 14. A lower cushion portion 82 extends upwardly from the lower edge of the front wall 22 and curves forwardly and intersects the front cushion 64. Similarly, the rear cushion 65 includes an upper planar surface 72 extending outwardly to an outer edge. The upper planar surface 72 extends from and perpendicular to the rear face 32 of the body 14. The lower cushion portion 82 of the rear cushion 65 slopes upwardly and outwardly at an angle from the bottom portion 37 of the rigid body 14.

As shown in FIGS. 1 and 3, another aspect of the invention includes a storage recess 58 which includes an interior bottom surface or base 60 and an upper open end portion 62. The base 60 of the storage recess 58 is recessed into the upper planar portion 74 of the resilient cushion. The upper open end portion 62 of the second storage recess 58 intersects the upper planar portion 74 of the resilient cushion. Generally, the storage recess 58 is known as a cup holder and is of a size that is convenient for holding beverage containers, such as 12 ounce soda cans and other open top substantially cylindrical cups and bottles.

It is preferred that within the front cushion 64 there is molded therein at least one front located storage recess 58 that is sized and shaped to function as a cup or beverage can holder. The front cushion 64 is wider than the width of the storage recess 58, therefore the front cushion 64 extends across a portion of the width of the front face 30 of the body 14. It is preferred that molded within the rear cushion 65 of the body 14 is a pair of rear located storage recesses 59. The rear cushion 65 is wider than the width of two rear located storage recesses 59 and extends across the entire width of the rear face 32 of the body 14.

The rear located storage recesses 59 are spaced at a distance below the hinge 80 sufficient to avoid having the rear of the closure 52 engage the upper portions of the beverage containers that might have been placed in a rear storage recess upon opening the closure.

The material that forms the front and rear storage recesses 58 and 59 is resilient and can be formed with a taper that frictionally grips the cylindrical bottom portion of a beverage can that is wedged downwardly into a storage recess. Additionally, the resilient nature of the storage recesses 58 and 59 provides for a gripping effect from the storage recesses 58 and 59 when slightly oversized containers are wedged downwardly into the storage recesses 58 and 59.

As shown in FIG. 2, a first substantially longitudinal slot 40 is formed in the front wall 22 of the rigid frame 12. Preferably, the first slot 40 extends upwardly from the bottom portion 26 of the frame 12 partially toward the upper portion 28 of the frame 12. A second substantially longitudinal slot 42 is molded in the front face 30 of the resilient exterior body 14. The second slot 42 extends upward from the bottom portion 37 of the body 14 partially toward the upper portion 35 of the body 14. The pair of substantially longitudinal slots 40 and 42 are aligned and provide a space for a center mounted emergency brake handle that may be present in the vehicle, to that the handle can be raised without the console 10 being a hindrance to operation of the emergency brake.

FIG. 2 illustrates a preferable arrangement whereby the open top portion 28 of the rigid frame 12, the front wall 22 and the rear wall 24 extend upwardly beyond the upper edges of the left sidewall 23 and the right sidewall 21. As shown in FIG. 3, this provides for a greater thickness of resilient material above the left side face 34 and the right side face 36 at the top portion 35 of the body 14. This added thickness of resilient material provides soft edges 39 to be formed at the tops of the sidewalls and offers a soft cushion and protection for the occupant's arms in the instance that the occupant leans on the console 10.

In another embodiment, the console 10 is fixable to the surface upon which it is placed. The console 10 may be fixed by clips or bolted through openings disposed in the console.

Figure 4:
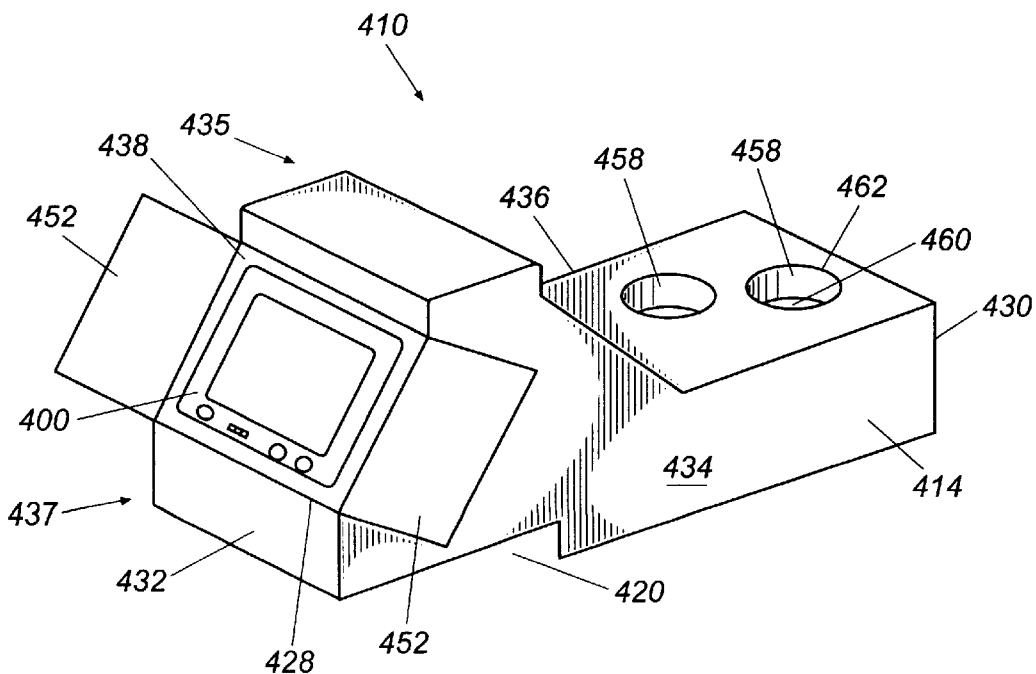
FIG. 4 illustrates a perspective view of the right side, rear and top portion of a second embodiment of the console.

FIG. 4 illustrates a second preferable embodiment of the resilient console 410 for usage on the floor of a passenger vehicle such as a van, or the like. The present embodiment is constructed of an internal rigid frame (not shown) and a resilient exterior body 414, of unibody construction, formed around and attached to the frame. Included is a storage recess 438 and a plurality of second storage recesses 458. The storage compartment 438 includes an open top portion 428 and is disposed in the console 410 towards the rear face 432 of the console 410. Preferably included is a closure or lid 452 to cover the open top portion 428 of the storage compartment 438. Preferably, the storage compartment 438 is used to contain a small to medium sized object such as a television 400. A storage recess 458 includes a base 460 and an upper open end portion 462. The storage recess 458 is disposed in the console 410 towards the front face 430 of the console 410, preferably in a pair. The base 460 is disposed below the plane of the surface of the body 414, and the open top portion 428 is disposed flush with and on the plane of the surface of the body 414 immediately surrounding the storage recess 458. Additionally, a low profile rectangular notch 420 is included towards the bottom portion 437 of the rear face 434 of the console. The notch provides a space for the positioning of a rectilinear object, such as a video cassette recorder (VCR), or the like.

Figure 5:
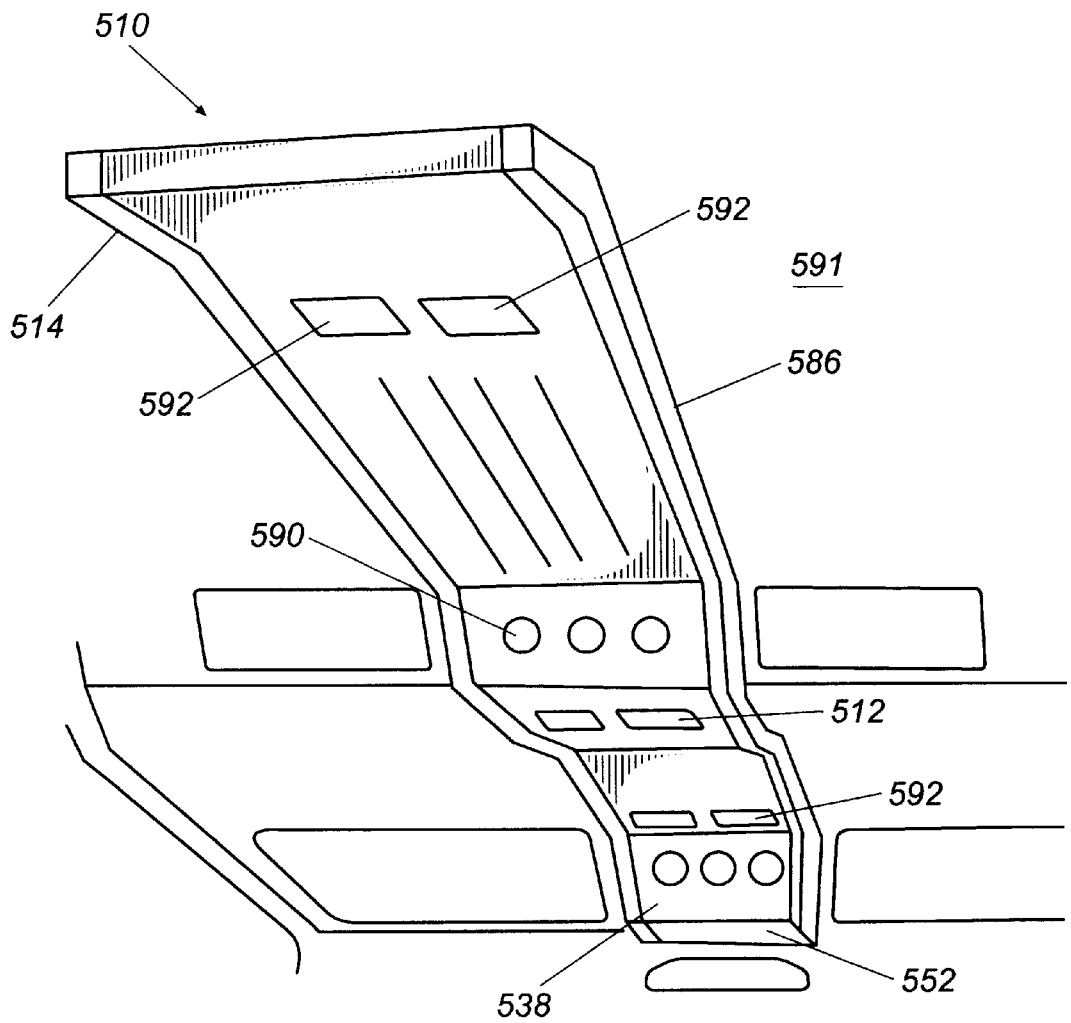
FIG. 5 illustrates a perspective view of a third embodiment of the console designed to be used on the interior roof of a passenger vehicle.

FIG. 5 illustrates a third preferable embodiment of the resilient console 510 for a passenger vehicle as adapted to be mounted to a ceiling 591 of a passenger vehicle, such as a conversion van or the like. The ceiling mounted embodiment includes a frame (not shown) and a resilient body 514 of unibody construction. The ceiling mounted console may be constructed to accept a connector means (e.g. a clip, screws, etc.) (not shown) for fixing the console 510 to an interior surface 591 of the vehicle. The fixing means is preferably conventional to the industry for attaching consoles to the interior roof of a passenger vehicle, such as a van. The console 510 preferably is mounted such that the top portion 586 of the console 510 is adjacent to and flush with the interior roof 591 of the passenger vehicle. The console 510 as adapted for a ceiling mount includes at least one storage compartment 538 with a lid or closure 552. As shown, the console houses utility dials 590 and interior lights 592, preferably, in several locations, making them easily accessible to passengers seated in various areas of the vehicle. The storage compartment 538 is molded as part of the body 514 of the console 510, resulting in a console 510 of a resilient unibody construction.

A preferred method of constructing the resilient console 10 for a passenger vehicle can be seen in FIGS. 2 and 3. In the preferred method of construction, a substantially rigid frame 12 is first built. If necessary, the exterior surfaces of the rigid frame 12 are coated with adhesive to make sure the foam material adheres to the frame 12. The rigid frame 12 is placed in a previously constructed mold such that the rigid frame 12 is spaced predetermined distances from the walls of the mold. The spaces about the frame 12 and inside the mold cavity are then filled with a self-expanding, self-skinning, resilient material, such as polyurethane which expands to fill the space between the rigid frame 12 and the mold. Some parts of the mold are shaped so as to form additional spaces between some of its surfaces and the facing surfaces of the frame so as to form, for example, a front cushion 64, a rear cushion 65 and storage recesses 58 and 59 formed in the cushions. Also, the soft upper edges 39 of the resilient exterior body 14 are formed by proper spacing of the mold surfaces from the rigid frame 12. This process creates a unibody constructed resilient foam body 14 adhered to and supported by the rigid frame 12. The closure 52 is constructed in a similar fashion. A rigid bottom layer 56 is placed in a mold such that the rigid bottom layer 56 is spaced a predetermined distance from the mold. The mold is filled with a self-expanding, self-skinning, resilient material. The resilient material expands to fill the space between the rigid bottom layer 56 and the mold, forming a resilient top layer 54. The closure 52 may then be attached to the console 10 by a hinge 80, for example. (FIG. 1) The rigid frame 12 and rigid bottom layer 56 of the closure are constructed of a rigid material such as wood, and the soft body 14 and soft top layer 54 are constructed of a resilient material such as a self-expanding, self-skinning, resilient polyurethane. Although described herein as being formed of particular material, it will be understood that the rigid frame 12, rigid bottom layer 56, the body 14, and the resilient top layer 54 can be made of other materials having similar such rigid and resilient qualities, respectively.

The foregoing description has been presented for purposes of illustration and description. It is not intended to be exhaustive or to limit the invention to the precise forms disclosed. Obvious modification or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modification and variations are within the scope of the invention as determined by the appended claims when interpreted in accordance with the breadth to which they are fairly and legally entitled.

What is claimed is:

1. A resilient console for mounting to a floor of a passenger compartment of a passenger vehicle comprising:

a rigid support housing for mounting to the floor of the passenger compartment of the passenger vehicle, said support housing having continuous external laterally facing surfaces and an internal compartment bounded by said external surfaces;

a resilient foam adhered to the external surfaces of said support housing and surrounding said support housing;

said resilient foam being characterized by having been molded about said rigid support housing and having areas of thickness forming approximately cylindrical open top receptacles for receiving beverage cans, cups and articles of breadths up to the breadth of the beverage cans.

2. A console for a passenger vehicle comprising:

a substantially rectangular rigid frame having an inner surface and an outside surface, an open top portion, a bottom portion, a front wall and a rear wall, and a substantially rigid inner shelf, wherein said open top portion defines an upwardly facing opening and said inner shelf is disposed between said upwardly facing opening and said bottom portion and fixed to said inner surface of said frame and substantially perpendicular to said inner surface;

a substantially resilient body being of unibody polyurethane construction, having an outer skin, said body being disposed around and adhered to said outside surface of said frame, said body having a front face, a rear face, a left side face and a right side face, a top portion and a bottom portion;

an internal storage compartment defined by said inner surface of said frame and said inner shelf, said internal storage compartment having said open top portion;

a removable closure having a top layer and a bottom layer wherein said top layer is substantially resilient polyurethane and said bottom layer is substantially rigid, said removable closure being disposed parallel to said inner member of said frame, said closure disposed on top of and covering said open top portion of said internal storage compartment, said top layer of said closure facing outward, said closure being hingedly fixed to said body and having a latch and keeper;

a substantially resilient polyurethane rear cushion formed as part of said body, said rear cushion having an upper planar surface and a lower cushion portion, said upper planar surface extending perpendicular from said rear face of said body and being a distance from the top portion of said body at said rear face and having an outer edge, the lower cushion portion of said rear cushion extending upward at an angle toward said outer edge of said upper planar surface of said rear cushion from the bottom portion of said body at said rear face;

a pair of rear storage recesses disposed in said rear cushion, said pair of rear storage recesses inset in said rear cushion and configured to receive a beverage container;

a substantially resilient polyurethane front cushion formed as part of said body, said front cushion having an upper planar surface and a lower cushion portion, said upper planar surface extending perpendicular from said front face of said body and being a distance from the top portion of said body at said front face and having an outer edge, the lower cushion portion of said front cushion extending upward at an angle toward said outer edge of said upper planar surface of said front cushion from the lower cushion portion of said front face of said body;

a front storage recess disposed in said front cushion, said front storage recess inset in said front cushion and configured to receive a beverage container; and means for fixedly attaching said console to a surface upon which the console is to be used.

* * * * *